United States Patent [19]
Desmarchais et al.

[11] 4,064,002
[45] Dec. 20, 1977

[54] EMERGENCY CORE COOLING SYSTEM FOR A NUCLEAR REACTOR

[75] Inventors: Walter E. Desmarchais, Monroeville; Leonard R. Katz; Bernard L. Silverblatt, both of Pittsburgh, all of Pa.

[73] Assignee: Westinghouse Electric Corporation, Pittsburgh, Pa.

[21] Appl. No.: 582,570

[22] Filed: May 30, 1975

Related U.S. Application Data

[63] Continuation of Ser. No. 384,322, July 31, 1973, abandoned.

[51] Int. Cl.² .................. G21C 9/00; G21C 15/00
[52] U.S. Cl. .................................. 176/38; 176/50; 176/61; 176/86 L; 176/87
[58] Field of Search .................................. 176/37, 36

[56] References Cited

U.S. PATENT DOCUMENTS

| | | | |
|---|---|---|---|
| 3,346,459 | 10/1967 | Prince et al. | 176/36 |
| 3,528,884 | 9/1970 | Collier | 176/37 |
| 3,816,245 | 6/1974 | Bevilacqua | 176/61 |
| 3,819,476 | 6/1974 | Pocock et al. | 176/37 |
| 3,849,257 | 11/1974 | Bevilacqua | 176/36 R |
| 3,920,514 | 11/1975 | Calvin | 176/38 |

*Primary Examiner*—Samuel W. Engle
*Assistant Examiner*—Ralph Palo
*Attorney, Agent, or Firm*—Zegmund L. Dermer; James R. Campbell

[57] ABSTRACT

An emergency core cooling system for a nuclear reactor which preferably is supplemental to the main emergency core cooling system incorporated in the reactor at the time of construction. Under circumstances of a rupture in the reactor primary coolant piping and consequent drop in reactor coolant pressure, emergency supplemental coolant is supplied from tanks or accumulators through check valves into the head closure plenum area. From there, the coolant is distributed downwardly through hollow support columns and through control rod guide thimbles to the top of the fuel assemblies which comprise the reactor core. The pressure and flow of the emergency supplemental coolant is sufficiently great to overcome the normal upward flow of primary coolant through the core, the result being that the supplemental coolant causes collapse of bubbles otherwise generated by the heat producing fuel rods thereby permitting the supplemental coolant to effectively and efficiently carry away heat generated in the core.

1 Claim, 4 Drawing Figures

EMERGENCY CORE COOLING SYSTEM FOR A NUCLEAR REACTOR

This is a continuation of application Ser. No. 384,322 filed July 31, 1973, now abandoned.

CROSS-REFERENCES TO RELATED APPLICATIONS

U.S. Patent application Ser. No. 259,327, filed June 2, 1972, by Erling Frisch and Harry Andrews, now abandoned, entitled "Emergency Core Cooling System for Nuclear Reactors," and assigned to the Westinghouse Electric Corp., discloses subject matter which relates to this application.

BACKGROUND OF THE INVENTION

The invention described herein relates to nuclear reactors and more particularly to an emergency core cooling system which operates to supply coolant from an emergency source to the reactor core under conditions of reduction in pressure of primary coolant in the reactor.

The function of an emergency core cooling system for nuclear reactors is to immediately flood the reactor core with highly concentrated neutron absorber material which acts to terminate the fission process and simultaneously prevent heat damage to fuel and fuel rods in the event of a major rupture in the reactor primary coolant system piping.

The Atomic Energy Commission general design criteria for nuclear reactors requires that all operating reactors include an emergency core cooling system and although different designs have been developed for this purpose, one well known system utilizes large pressurized tanks or accumulators which discharge highly concentrated borated water directly into a pressurized water reactor when the pressure of primary coolant circulated from the reactor through a heat exchanger or steam generator drops below about 660 psi. This emergency coolant normally is injected into the primary coolant inlet pipes near the reactor inlet nozzles to assure delivery directly into the area containing the reactor fuel assemblies. It has been determined that current emergency cooling systems are completely effective to cool the fuel and fuel rods under circumstances of minor breaks in any component, including piping in the reactor coolant flow paths.

However, a major rupture, i.e., a full circumferential break and separation of the primary coolant inlet piping, creates unusual problems because the pressure of primary coolant still being circulated through the reactor from the other primary loops tends to cause the coolant to flow towards the area of reduced pressure which is represented by the pipe break. As the emergency coolant from the accumulator is then introduced into the inlet coolant pipes, the emergency coolant in-flow blocks the normal coolant attempting to escape through the fractured inlet pipe. Although the accumulator pressure is sufficient to overcome the out-flowing coolant, it is suspected that because of the tortuous inlet flow path in the reactor, the fuel and fuel rods comprising the core may become partially starved of coolant. Such starving and the accompanying drop in coolant pressure, allows the water circulating around the fuel rods to boil, thus generating bubbles which rise in the core and partially block flow laterally through the normal coolant outlet. Even though the likelihood or possibility of such a major rupture occurring is so extremely remote as to not dictate the need for designs to cover the situation, in view of the public interest, the systems are nevertheless designed to accommodate the most remote possibility of accidents.

In recognition of this problem, the emergency core cooling system disclosed in the above Frisch et al. patent application was designed to handle all loss of coolant situations by conducting emergency coolant downwardly through unused control rod guide thimbles or tubes into the reactor core. According to that disclosure, water enters the upper end of each guide thimble and is discharged near the lower end thereof inside the core in the form of a spray which is directed radially outward against adjacent fuel rods. This direct contact with the fuel rods thus increases the cooling efficiency and assures delivery of the required volume of water into the core. Tests on this type system show its great effectiveness, efficiency and reliability and the only known drawback lies in the labor and material costs necessary for installation and for subsequent removal when the reactor is being refueled.

The above discussion therefore suggests the need for a system which may independently be used for emergency cooling purposes, or alternatively, be used as a system supplemental to present emergency core cooling systems but of sufficient simplicity to eliminate the relatively high costs inherent in the Frisch et al design.

SUMMARY OF THE INVENTION

Briefly stated, the above disadvantages are eliminated in the present invention by providing an emergency core cooling system which discharges neutron absorber material, such as borated water, from a separate system of accumulators into the area beneath the reactor head and above the upper support plate structure for further distribution through coolant conducting devices to the top of the reactor core. The spaces above the reactor core provides a manifold-like chamber which serves to feed the emergency core coolant downwardly past the fuel rods in each fuel assembly, thus carrying away both residual heat in the fuel rods and that heat which is still being generated by the fuel. The system may be designed to supplement present emergency core cooling equipment incorporated in the reactor or it may independently serve as the sole emergency core cooling system for cooling the fuel rods under reactor loss or reduction of coolant conditions.

An object of the invention therefore is to provide an emergency core cooling system which introduces emergency coolant into the closure head area of a nuclear reactor for distribution to the reactor core for core cooling purposes.

Another object of the invention is to provide an emergency core cooling system for a nuclear reactor which is supplemental to an emergency cooling system used for core cooling purposes.

Still another object of the invention is the provision of an emergency core cooling system which conducts coolant from the top of the reactor downwardly through the core and in a direction counter to the normal flow of primary coolant in the system.

BRIEF DESCRIPTION OF THE DRAWINGS

While the specification concludes with claims particularly pointing out and distinctly claiming the subject matter which comprises the invention, it is believed the invention will be better understood from the following description taken in connection with the accompanying drawings in which:

Figure 1:
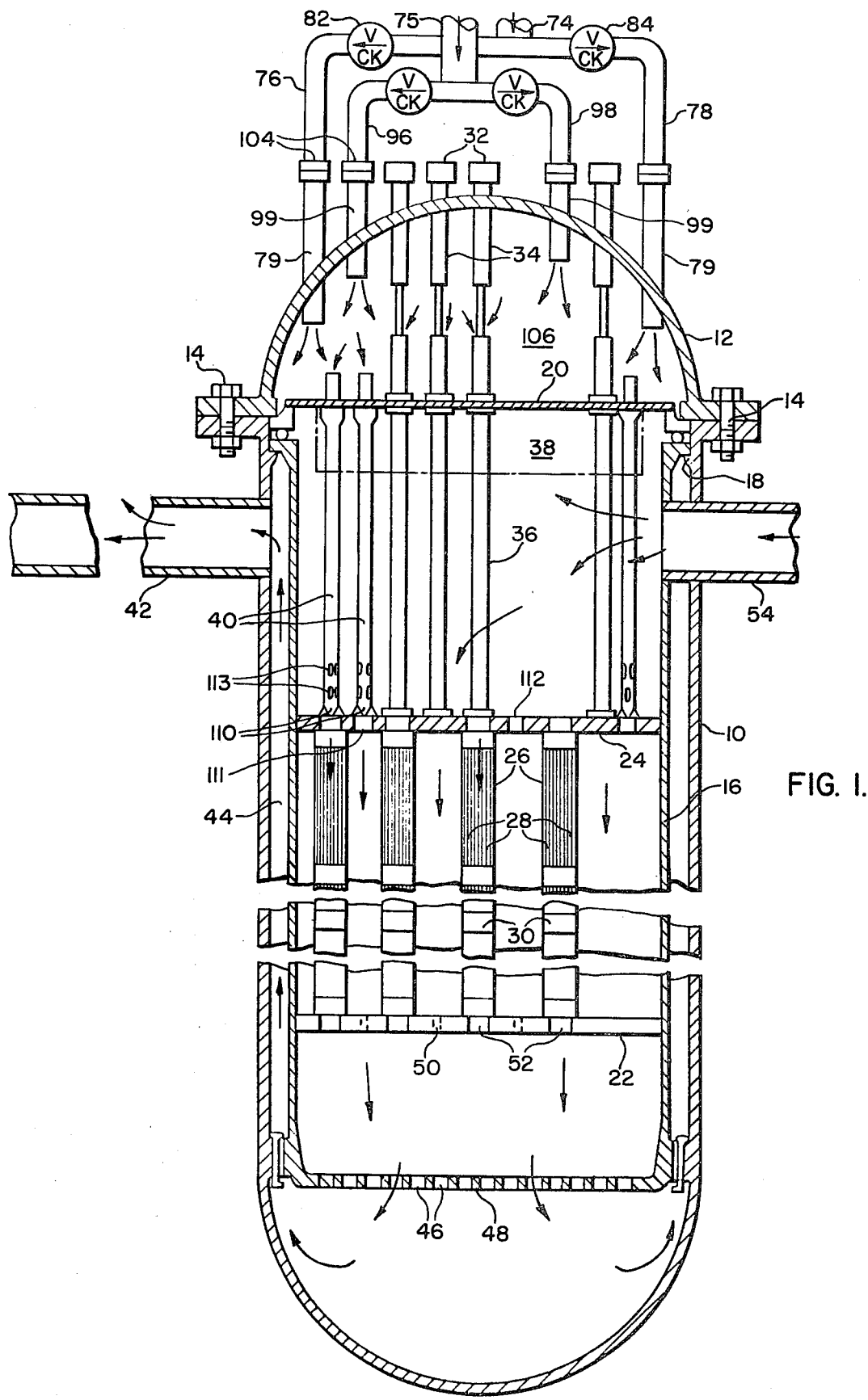
FIG. 1 is a view in elevation, partly in section, generally showing the major components and a portion of the emergency cooling system piping of a nuclear reactor.

Referring now to the drawings wherein like reference characters designate like or corresponding parts throughout the several views, there is shown in FIG. 1 a nuclear reactor comprising a pressure vessel 10 having a hermetically sealed closure head 12 attached to the upper end thereof by bolts 14 or similar securing means. The reactor shown to illustrate the invention is a pressurized water reactor but it is to be understood that the invention is equally applicable to other nuclear reactors which use other and diverse coolants for carrying away heat generated by the reactor core. A core barrel 16 is supported from a ledge 18 machined on the upper end of the pressure vessel and is clamped in a firm position by a seal ring between an upper plate 20 and the closure head 12 when the bolts 14 are tightened. As in conventional constructions, a lower core plate 22 and an upper core plate 24 are secured to the inner surface of core barrel 16 and these plates serve the function of holding the core in an immovable position and for accepting the flow and load forces from the core which are transmitted to the pressure vessel. The core comprises a multitude of fuel assemblies 26 each of which includes a multiplicity of fuel rods 28 held in a predetermined relationship with each other by grids 30 spaced along each fuel assembly length. Although the number and size of fuel rods and therefore the fuel assemblies vary from reactor to reactor, one well known design contains approximately 400 fuel rods fuel assembly and the complete core comprises approximately 200 fuel assemblies so that when the reactor is in operation, sufficient heat is generated by the core to power apparatus which furnishes approximately 1,100 megawatts of electrical power. To control the reactor fission process, a number of control rod drive mechanisms 32 mounted above the closure head 12, are coupled through a control rod drive assembly 34 to control rods (not shown) which are housed in control rod guide thimbles 36. As is well known, the control rods are axially immovable in the fuel assemblies 26 for controlling the amount of heat generated by fuel contained in fuel rods 28. These control rod drive mechanisms 32 are supported in the reactor by an upper structure generally indicated 38 and the upper support plate 20. Support columns 40 serve to space the plates 20 and 24 and additionally impart strength and rigidity to the structure.

During operation, coolant is introduced through inlet 42 and flows downwardly in the annulus 44 to the bottom of the pressure vessel where its direction is reversed for flow upwardly through openings 46 in base plate 48. (The arrows in FIG. 1 show flow direction under conditions of a rupture in an inlet page 42 and not the direction of coolant flow during normal reactor operation.) Flow continues upwardly through openings 50 and 52 in lower core plate 22 and through fuel assemblies 26 for absorbing heat generated by the fuel. The thus heated coolant then flows outwardly through outlet 54 and into a closed loop which includes a pump and a heat exchanger, not shown, used for transferring heat from the coolant to a secondary coolant circulated in a heat exchanger-turbine loop as is well known in the art.

The reactor disclosed above is of well known design and is equipped with two or more primary loops, each of which include an outlet, eg, 54, a pump, steam generator and a cold leg return to one of the reactor inlets, such as 42. In the event a break occurs in the reactor inlet piping, coolant pressure responsive elements act to cause insertion of the control rods into the core to substantially terminate the fission process, and simultaneously, an emergency core cooling system discharges borated water or other neutron absorbing material from accumulator tanks, not shown, into the inlet 42 to the reactor. The emergency coolant then flows through the other inlets, downwardly through the annulus 44 and upwardly through the core for carrying away both residual heat remaining in the fuel rods and that heat which still may be generated by the fuel. Since coolant also is being returned from the other primary loops, a portion of the emergency and primary coolant will flow outwardly through inlet 42 as shown by the arrows in FIG. 1 while the remainder coolant flows through outlets 54. In some cases, depending on the size of break and therefore the resistance to outlet flow, some coolant may be returned through the outlets toward the inlets also as shown by the FIG. 1 arrows.

According to this invention, the upper head injection system may be used as a cooling system supplementary to the conventional emergency core cooling system normally used with the reactor, or the upper head injection system components may be sized larger and the system then used as the sole emergency core cooling system.

Figure 2:
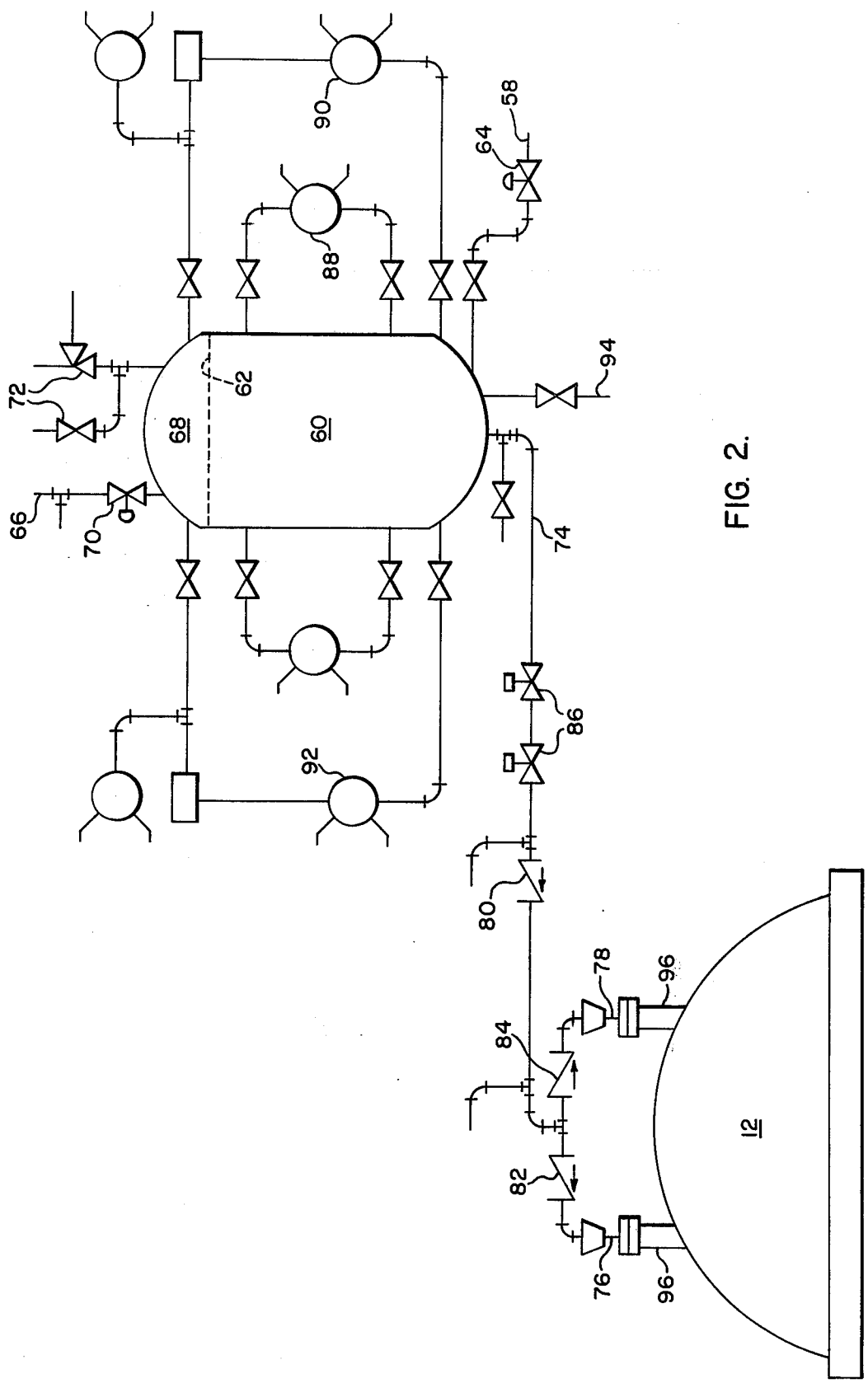
FIG. 2 illustrates an upper head injection system used for supplying emergency coolant to the reactor core.

FIGS. 1 and 2 illustrate an upper head injection system whose function is to provide cooling of the core during a loss of coolant transient for a large rupture in a cold leg of the reactor cooling system. The emergency coolant which in the case of a pressurized water reactor may comprise borated water having a concentration of 2,000–2,500 ppm boron, is supplied from a source through fill line 58 and stored in a pair of steel tanks or accumulators 60 (one shown) to the level 62 shown. Other diverse kinds of coolants may be used with different types of reactors, the invention herein being disclosed in relation to a pressurized water reactor. One or more accumulators and their associated systems may be used, one being shown for simplicity and greater ease for understanding the invention. Motor operated gate valve 64 functions to permit initial and subsequent filling of the accumulator and when closed, serves to isolate the accumulator from the borated water source. Nitrogen gas from a connected source 66 fills the void area 68 in the accumulator and serves to pressurize the borated water therein. Motor operated gate valve 70 isolates the accumulator from the gas source and pressure relief valve 72 is provided to accommodate excessive pressure which may be generated in the system. The relief valve is sized to pass nitrogen gas at a rate in excess of the accumulator fill line delivery rate or the maximum pump makeup rate.

Each accumulator 60 is connected to the closure head 12 on the reactor by a 12-inch pipe 74 which branches into a pair of 6-inch pipes 76 and 78. Different size accumulators and connected lines may be used depending on the size of reactor being served. The accumulator discharge lines 74 are equipped with a check valve 80 in series with check valves 82 and 84 located in each of the 6-inch lines. Gate operated valve 86 serves as an accumulator isolation valve to prevent leakage of water between the reactor and accumulator under conditions when the reactor is not normally supplying heat to coolant flowing in the primary loop. Normal water pressure prevailing in the reactor is about 2,500 psi. and the accumulators are charged to about 1,500 psi., although it is to be understood that different size reactors will have different operating pressures and that these parameters are used for illustrative purposes. With the reactor in operation, gate valves 86 are opened and the greater pressure of coolant being circulated through the reactor holds the check valves 80, 82 and 84 against their valve seats. These check valves are the only impediment to flow of borated water from the accumulator to the reactor. In the event the reactor pressure drops below 1,500 psi., the greater accumulator pressure forces the check valves open and borated water then flows through an unrestricted flow path directly into the reactor coolant system.

Since it is necessary that nitrogen gas not be introduced into the reactor coolant system, flow level gas and water level detectors 88 and 90 connected to each accumulator sense the levels and act to automatically shut valves 86 when blowdown of the accumulator occurs. Likewise, to accommodate water expansion in this system, a high level detector 92 acts to open drain line 94 to maintain the proper volume of borated water in the accumulators.

As indicated above, two accumulators may be used, each accumulator being connected to two head penetrations. As illustrated in FIGS. 1 and 2, accumulator 60 is connected to the 12-inch header 74, branch lines 76, 78 and head penetrations 79 while the other accumulator (not shown) would be connected to the 12-inch header 75, 6-inch lines 96 and 98, including check valves, which terminate in the other two head penetrations 99. The arrows in FIG. 1 illustrate the flow path of borated water introduced into the closure head plenum area 106.

The borated water is conducted from the plenum area 106 to the core through hollow support columns 40. These columns are welded or otherwise secured to the upper support plate 20 and terminate at their lower ends in upper core plate 24. The lower end of each column at its point of attachment to plate 24 is equipped with a nozzle-like opening 110 placed directly over holes 111 in the plate through which the borated water is discharged onto the top of fuel assemblies and between adjacent fuel assemblies for further distribution downwardly through the core and in so doing, not only precludes the generation of bubbles of steam formed by the boiling water but also carries away the residual heat of the fuel rods and that heat which may continue to be generated by the fuel in the fuel rods even though the control rods have been completely inserted into the core. Orifices 113 in the bottom of support columns 40 permit the escape of coolant from the fuel assemblies immediately beneath columns 40 for discharge through outlets 54 during normal operation.

FIG. 1 illustrates the flow patterns which occur when the upper head injection system described above is placed in operation. As a break occurs in any of the reactor components and/or especially should an inlet pipe completely rupture, which is the most severe case expected to be encountered in operation, the pressure of the coolant circulated through the reactor and the primary loops drops from its approximate value of 2,500 psi. to a value lower than 1,500 psi. Such a drop in reactor coolant pressure causes the upper head injection system to be placed in operation. The pressure in accumulator 60 forces check valves 80, 82 and 84 to open position and borated water is supplied through pipes 76, 78, 96 and 98 to the plenum area inside the reactor closure head. The borated water flows from the head closure area down between the space between control rods and the control rod guide thimbles 36 and is discharged directly into the fuel assembly 26. Simultaneously, borated water from the closure head flows through support columns 40 and is discharged through nozzles 110 and openings 111 into the core for flow downwardly to scrub the outside surfaces of each fuel rod and thus preclude the generation of steam bubbles formed by boiling water. To make its exit from the core, the borated water flows upwardly through the annulus 44 and out the inlet 42 with some water likely flowing through outlets 54. Simultaneously, the expanded flow from the normal outlet 54 may reverse itself and likewise flow into the upper part of the reactor prior to being distributed downwardly through the core or flowing directly toward the break in inlet lines 42. Since the insertion of control rods in the core will essentially stop the reactor fission process, the addition of water having a boron concentration of 2,000 to 2,500 parts per million boron will help assure complete capture of neutrons and thus stop the generation of heat which results from the fission process taking place in the fuel.

Figure 3:
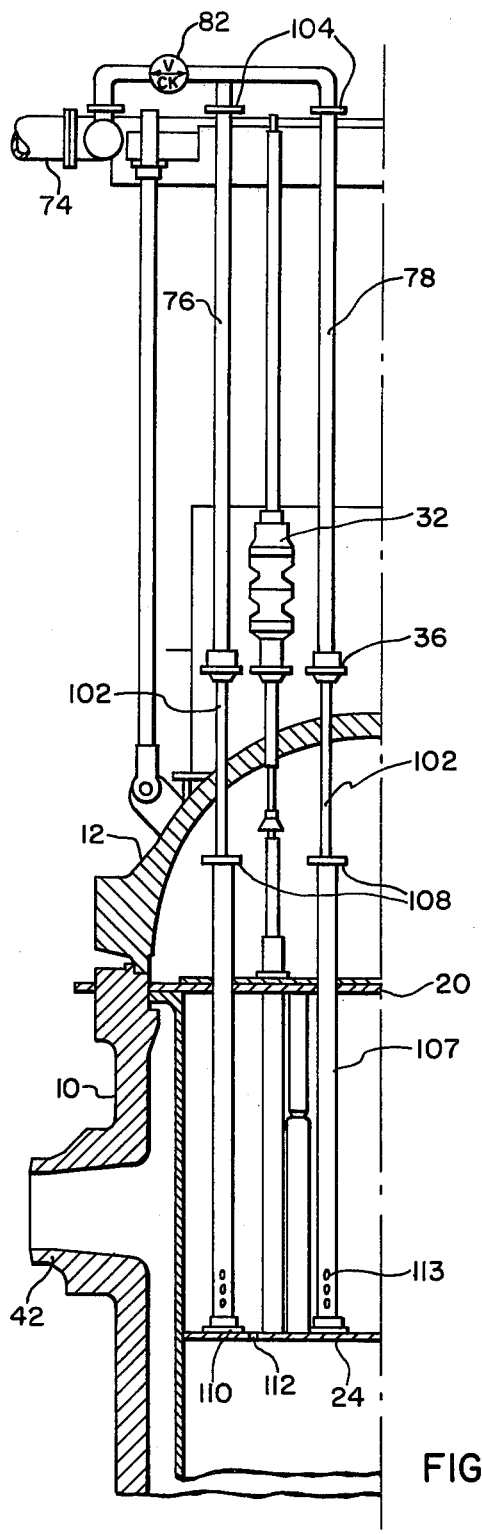
FIG. 3 is a detailed view showing a portion of piping used for delivering emergency coolant to the reactor core.
Figure 4:
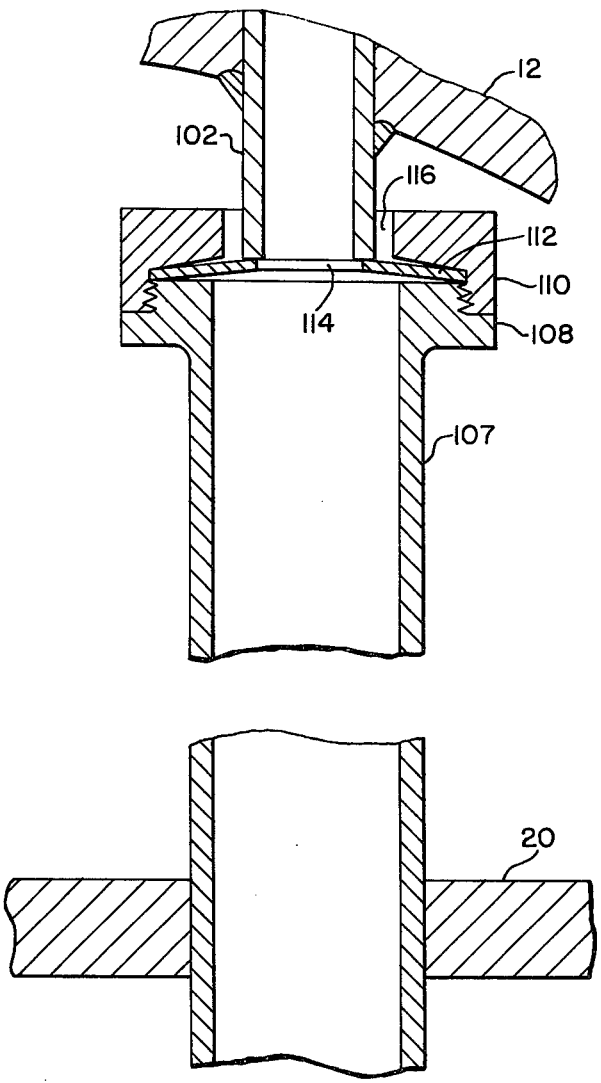
FIG. 4 is a detail view showing a typical support column and its connection to upper and lower core plates in the reactor.

FIG. 3 illustrates a modified construction for supplying borated water from accumulator 60 to the reactor core. Instead of discharging borated water into the closure head plenum area, it is conducted directly by pipes to the reactor core. As in the FIG. 1 design, main headers 74 and 75 lead from the accumulator into 6-inch lines 76, 78, 96 and 98 which extend downwardly for connection to the upper end of spare head adapters 102 located near the side of closure head 12. The upper end of pipes 76 and 78 includes Conoseal joints 104 where connections are made between connecting sections of pipe and to the main header 74. Inside the reactor vessel closure head the connection between the bottom of the spare hollow head adapter 102 and the downcomer piping 107 is made by a flexible gasket compression joint 108 of the type illustrated in FIG. 4. As shown in FIG. 4, the lower end of the head adapter 102 terminates inside cap 110 for the compression gasket 108. The cap 110 is screw threaded onto the upper end of downcomer piping 107 and a gasket 112 shaped to the configuration of a distorted disk and having a central opening 114, is locked in position between the cap 110 and the upper end of the downcomer tubing. As shown, the space 116 between the outer peripheral surface of the adapter 102 and the opening formed in cap 110 provides a clearance space utilized to accommodate lateral displacement of the connecting pipes. The function served by this type piping arrangement is to permit the making of a connection between the lower end of the head adapter and the downcomer tubing when the reactor closure head is placed in position on the pressure vessel. Although the components are highly machined and accurately aligned, the space 116 is used to accommodate slight lateral displacement of the parts when the closure head is placed in position. As in the FIG. 1 construction, the downcomer tubing 107 is secured to upper plate 20 and upper core plate 24 in the same manner, including the use of a nozzle 110 and aligned openings 111, which provide an avenue for the flow of borated water directly from the accumulators and connecting piping and downcomer tubing to the top of the reactor core.

As indicated previously, the upper head injection system may be used independently for emergency core cooling purposes or it may be used to supplement conventional emergency core cooling systems.

It will be apparent that many modifications and variations are possible in light of the above teachings. It therefore is to be understood that within the scope of the appended claims, the invention may be practiced other than as specifically described.

What is claimed is:

1. An emergency core cooling system for a nuclear reactor comprising a pressure vessel hermetically sealed by a closure head, a reactor core in the pressure vessel and an inlet and outlet for circulating coolant through the reactor core;

emergency coolant means including at least one accumulator having a pressurized neutron absorber material therein;

an outlet on said accumulator connected with the closure head for discharging said absorber material into the pressure vessel;

flow restricting means between said accumulator and closure head which permits flow of absorber material only from the accumulator toward the reactor, said flow restricting means being held closed by the pressure of coolant in said reactor, the arrangement being such that when the reactor coolant pressure drops below the accumulator pressure, neutron absorber material flows from the accumulator into the pressure vessel; and means in said pressure vessel for conducting the neutron absorber material from the accumulator to the top of said core for distribution downwardly therethrough for carrying away heat generated in the core;

said conducting means comprising piping supported by the closure head, said piping being arranged to extend from the accumulator outlet to a plenum chamber under the closure head, thereby providing an avenue for the discharge of absorber material from the accumulator into the plenum chamber;

means communicating with the plenum chamber and top of said core for conducting the absorber material to the core;

said piping extending from the accumulator outlet further being connected to downcomer tubing supported in the pressure vessel and having openings which discharge said absorber material directly on to the reactor core, thereby permitting it to flow in and between fuel assemblies in the core;

a connector connecting said piping and downcomer tubing, said connector being designed to allow for lateral displacement of the tubing and piping after the closure head is mounted on the pressure vessel;

high and low liquid level sensors in said accumulator;

valve means in said piping connected to the accumulator outlet; and means connecting said sensors with said valve means in the piping which are operable to close said valves when the absorber material level in the accumulator rises or falls respectively to predetermined levels.

* * * * *